G. H. KENT, DEC'D.
B. G. KENT, ADMINISTRATRIX.
DEPOSIT BOOK.
APPLICATION FILED JULY 24, 1916.

1,389,561.

Patented Aug. 30, 1921.
2 SHEETS—SHEET 1.

Inventor
George H. Kent
By Jas. H. Churchill
Atty.

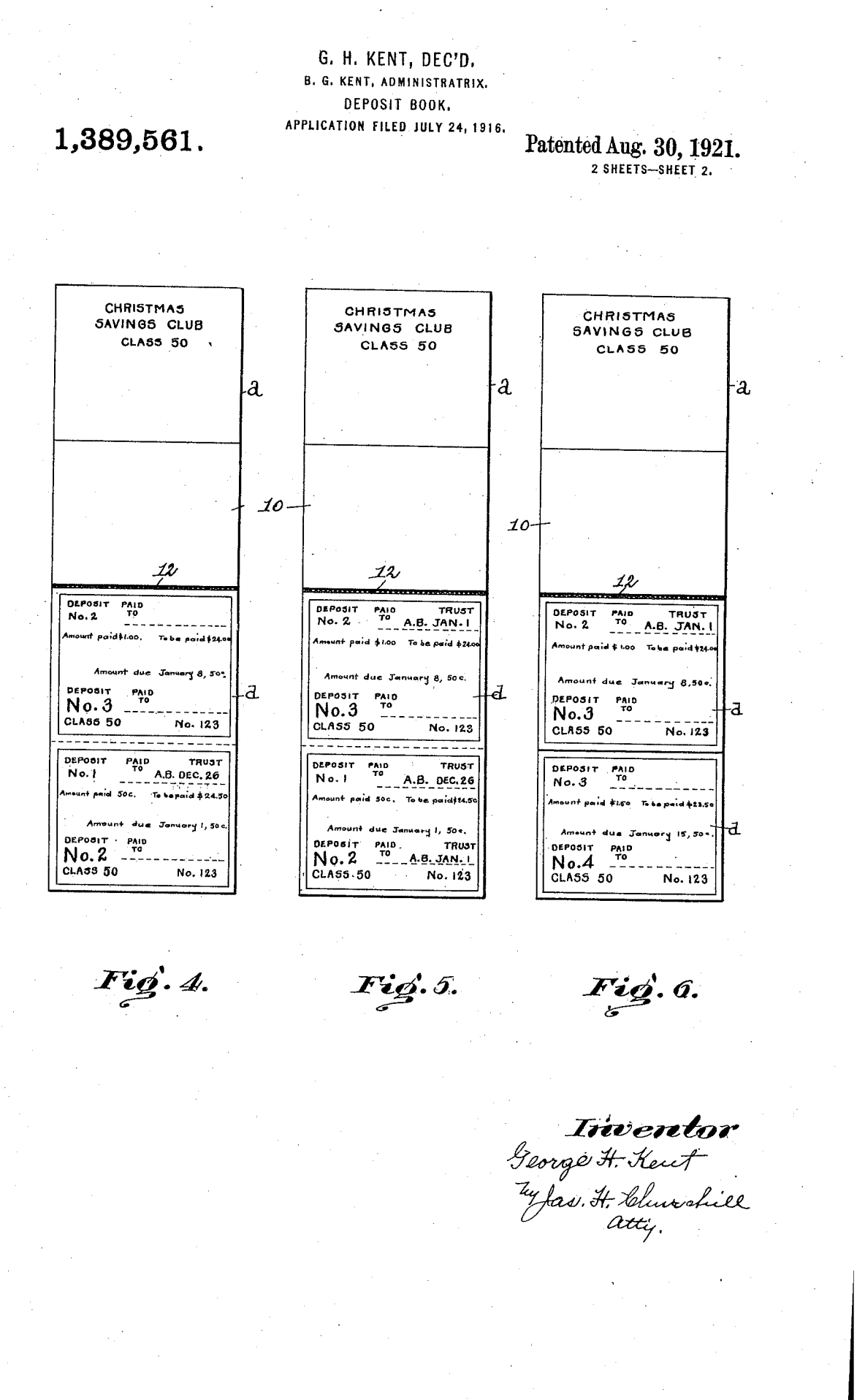

G. H. KENT, DEC'D.
B. G. KENT, ADMINISTRATRIX.
DEPOSIT BOOK.
APPLICATION FILED JULY 24, 1916.

Fig. 4.  Fig. 5.  Fig. 6.

Inventor
George H. Kent
by Jas. H. Churchill
Atty.

UNITED STATES PATENT OFFICE.

GEORGE H. KENT, OF WATERTOWN, MASSACHUSETTS; BERTHA G. KENT ADMINISTRATRIX OF SAID GEORGE H. KENT, DECEASED.

DEPOSIT-BOOK.

1,389,561. Specification of Letters Patent. Patented Aug. 30, 1921.

Application filed July 24, 1916. Serial No. 110,880.

*To all whom it may concern:*

Be it known that I, GEORGE H. KENT, a citizen of the United States, and a resident of Watertown, in the county of Middlesex and State of Massachusetts, have invented an Improvement in Deposit-Books, of which the following description, in connection with the accompanying drawings, is a specification, like characters on the drawings representing like parts.

This invention relates to a deposit book of a novel construction and arrangement, which is adapted for use by banks or like institutions and their depositors, and which is especially useful in connection with savings deposit clubs, in which a number of payments are made in regular order and frequency.

The invention has for its object to provide a deposit book having leaves or members composed of one or more coupons, which are designed to be torn off and deposited with the bank at the time the deposit or payment called for by the coupon is paid into the bank.

The coupons are consecutively numbered, and each coupon after the first is provided with an additional number corresponding to the number of the preceding coupon.

Each coupon may and preferably will be provided with a number indicative of the deposit book and a number indicative of the class or character of the book, and is further provided with a space for the signature or other identification mark of the clerk or other person receiving the money from the depositor. The coupons are designed to be torn from the book and kept by the bank, and the book with coupons calling for future deposits is kept by the depositor, and in accordance with this invention, both parties are provided with a receipt of the amount deposited and with the name or other means for identifying the receiver of the deposit, whereby each deposit slip or coupon when received by the bank becomes a connecting link in a chain of coupons, which gives a complete interlocking record, so that mistakes or irregularities made by any clerk, can be traced to its original source.

These and other features of this invention will be pointed out in the claims at the end of this specification.

Figure 1:
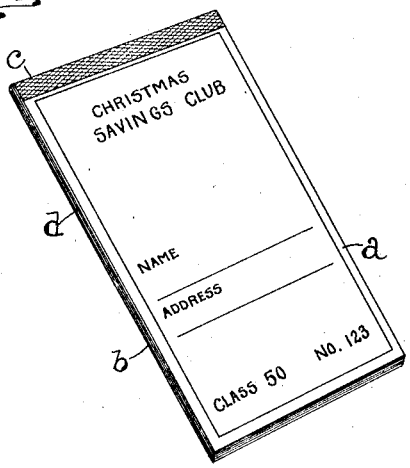

Figure 1 is a perspective of a deposit book embodying this invention.

Figure 2:
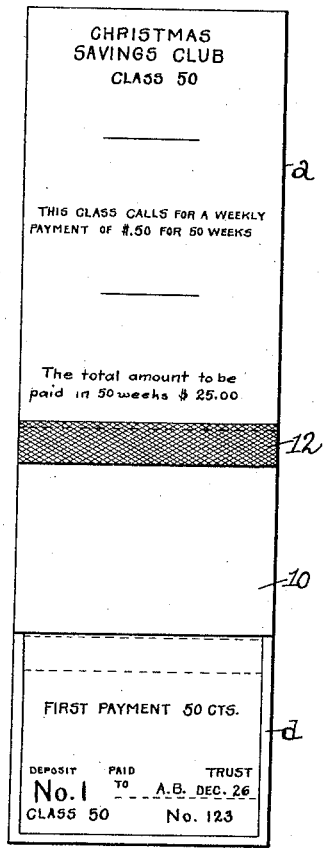

Fig. 2, a view in elevation of the book with the cover leaf thrown back and disclosing the first or No. 1 coupon and a device for assisting in detaching the coupons.

Figure 3:
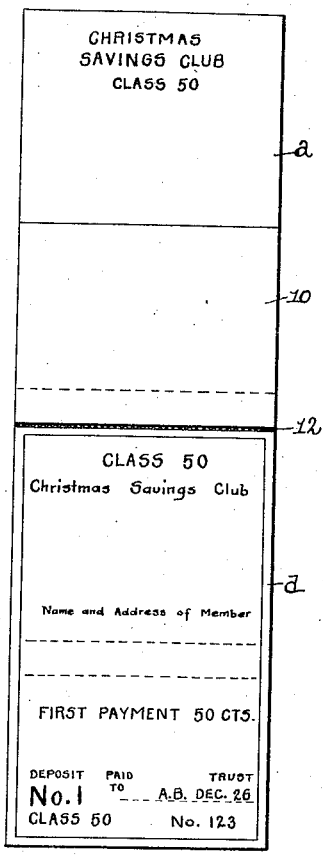

Fig. 3, a view like Fig. 2, with the detaching device turned up into position to permit the No. 1 deposit coupon to be detached.

Fig. 4, a view like Fig. 3 with the No. 1 deposit coupon detached.

Fig. 5, a view like Fig. 4 with the No. 2 deposit coupon filled out and ready to be detached, and Fig. 6, a view like Fig. 5 with the No. 2 deposit coupon detached.

The deposit book herein shown as embodying this invention is provided with a front cover $a$, a rear cover $b$ hinged to the cover $a$ by tape $c$ or other suitable means, and a plurality of intermediate leaves or members $d$. Each leaf or member $d$ comprises one or more deposit slips or coupons, and in the present instance, the first leaf, shown in Figs. 2 and 3, has its lower half or part provided with suitable printing or marks to constitute a deposit slip or coupon, and has its upper half or part provided with suitable printing to identify the class or character of the book and the name and address of the depositor.

The deposit slip or coupon is marked with a number indicative of a deposit, the amount of which may and preferably will also be printed on the coupon, which in the present instance is fifty cents.

The coupon is also provided with a space for the name of the bank, and the name, initials or other mark for identifying the clerk or other person receiving the deposit, and preferably also the words "Paid to."

The coupon is also provided with means for associating the coupon with the book, and in the present instance, the coupon is provided with the word Class and number 50, and also the number 123, which correspond to the class number and book number on the cover of the book and identify the character of the deposit book and the person to whom it belongs.

Each succeeding leaf or member of the book comprises one or more coupons, and, in the present instance, each succeeding leaf or member is shown as comprising two coupons, as represented in Figs. 4 to 6, and these coupons are arranged with the coupon bearing the lower number forming the lower half of the leaf. Each coupon after the No. 1 coupon is provided with a deposit number, a class number, the book number, and a space for the receiver's name or identifying mark, and in addition with a number indicative of the previous deposit and coupon, and is further provided with a space for the reception of the name or identifying mark of the receiver of the previous deposit and coupon. By reference to Fig. 4, it will be seen that deposit coupon No. 2 has on it a space for the signature or identifying mark of the receiving clerk opposite or substantially in line with No. 2, and in addition at the top of the coupon the word Deposit and No. 1, and opposite this number, the name of the bank, which is indicated by the word Trust, the initials of the clerk who received the No. 1 deposit, namely, A. B., and the date of No. 1 deposit, to wit: December 26.

No. 3 deposit coupon is similarly marked, except that it has on it Deposit No. 2. The succeeding coupons are similarly marked.

It will be noticed that each coupon after the first is provided with two deposit numbers, one of which is to identify the coupon on which it appears and the other to identify the preceding coupon.

It will also be noticed, that each coupon succeeding the first is provided with two spaces for the signature or identifying mark of the clerk receiving the respective deposits.

In this manner both parties are provided with a receipt for the money deposited with each coupon, for when a deposit is made, the clerk signs for the bank on the coupon opposite the No. indicative of the particular deposit, and also opposite the same number on the next succeeding coupon. To illustrate: When the depositor makes his first payment, the clerk receiving the money stamps or otherwise marks the No. 1 coupon with the name of the bank, represented by the word Trust in the present instance, and also with his initials, to wit: A. B. and the date on which the deposit is made. The clerk also marks No. 2 coupon opposite Deposit No. 1 thereon, with the name of the bank, his initials and the date of deposit, and then tears off No. 1 coupon and retains the latter and hands back the book to the depositor.

The book is now in the condition represented by Fig. 4. When the second deposit is made, the depositor presents the book in the condition represented in Fig. 4 and tends to the clerk the amount called for, which in the present instance is fifty cents. The clerk receives the deposit and marks the No. 3 coupon in the same manner opposite Deposit No. 2 on the No. 3 coupon.

The book is now in the condition represented by Fig. 5. The clerk then detaches No. 2 coupon, retains the same and hands back the book to the depositor. By reference to Fig. 5, it will be seen that No. 2 coupon bears the name of the bank, the identifying mark of the clerk, and the date of the second deposit, which latter is Jan. 1, and it will also be noticed that the No. 2 coupon has on it the receipt for the previous deposit, No. 1, to wit: the name of the bank, the identifying mark of the clerk, and the date of the previous deposit. It will also be observed, that the book handed back to the depositor after the No. 2 coupon has been detached, has a receipt for the No. 2 payment marked on No. 3 coupon opposite Deposit No. 2 thereon. The book is now in the condition represented in Fig. 6, with the Nos. 3 and 4 coupons exposed to view. The same steps are taken at each subsequent deposit, until the last deposit is made, whereupon the depositor is paid for the full amount called for by the book. It will be observed, that when all the coupons are detached, there remains nothing but the two covers of the book, which take up a minimum amount of space and a large number can be filed away in the bank in a small space.

It may be preferred to provide the book with a device for assisting the clerk in detaching the coupons, and to this end, I have provided the book with a substantially stiff card 10 of substantially the same size as a coupon and have hinged the same to the book between the front cover $a$ and the initial coupon, preferably, by a flap 12 of textile material, which is glued or otherwise affixed to the front side of the card 10, so that when the latter is in its normal position, represented in Fig. 2, its lower edge is at the top edge of the lower coupon, and affords means for assisting in tearing off the lower coupon, and when the card 10 is turned up against the front cover $a$, as represented in Figs. 3 to 6, inclusive, the upper edge of the card 10 is brought into proper position for the upper half of the first leaf and for the upper coupons of the remaining leaves to bear against, when these coupons are to be detached.

The coupons succeeding the No. 1 coupon, may be provided with additional printing matter if desired, as, for instance, they may have printed upon them, the amount paid in, the amount remaining to be paid, and the amount due on the next payment and the date on which the next paymenet is due. Such matter appears on the coupons Nos. 2, 3 and 4.

It is preferred to embody the invention, in the form of a book, but it is not desired to limit the invention in this respect, as it is evident that the coupons might be made of stiffer material and in the form of cards.

From the above description, it will be seen, that each deposit slip or coupon is a receipt from the bank to the holder of the coupon for each previous deposit slip with its deposit, and when given to the bank with its deposit, becomes an interlocking record for the bank, which cannot be broken without showing by whom and when the break was made. The holder of the deposit book can see at a glance, how many coupons he has deposited, the amount of money deposited, the date of his last deposit, the date the next deposit becomes due, and his receipt for his last deposit.

It may be preferred to provide each leaf after the first leaf with two coupons, as this arrangement is most convenient for the bank, inasmuch as both spaces to be signed by the clerk are always in view, and turning of leaves by the clerk is avoided, which is a time-saver where a large volume of business is done, but it is not desired to limit the invention in this respect.

Claims:

1. A deposit book of the character described, comprising a plurality of coupons, each of which is provided on one face with means indicative of a deposit to be made and on the same face with a space associated with said means, and each succeeding coupon being also provided on the said face with means indicative of the preceding coupon and with a space associated with the last mentioned means for data to indicate that the prior coupon has been paid when said space has been validated.

2. A deposit book of the character described, comprising a plurality of leaves or members, some of which are provided with means for sub-dividing them into coupons, each of said coupons being provided on one face with means indicative of it and having a space associated with said means and also provided on said face with additional means indicative of the next preceding coupon and with a space associated with said last-mentioned means.

3. A deposit book of the character described, comprising a plurality of leaves or members provided on one face with numbers to indicate consecutive coupons and having spaces associated with said numbers, and each succeeding coupon being provided on said face with an additional number indicative of a preceding coupon and with a space associated with said additional number.

4. A deposit book of the character described, comprising cover leaves and a plurality of intermediate leaves, the initial leaf having means on it to designate a coupon, and having a space associated with said means and succeeding leaves having on them means for designating a coupon and additional means for designating its immediate preceding coupon, and provided with a space associated with said additional means and a device hinged to the book between the initial leaf and the front cover and of a size substantially equal to one-half of each leaf.

5. A coupon of the character described, provided on one face with a number indicative of it and on the same face with an additional number indicative of a preceding coupon, and having blank spaces on the same face associated with said numbers for the purpose specified.

6. A deposit book of the character described, comprising a plurality of coupons, the initial coupon being provided on one face with means indicative of a deposit and with a space associated with it for identification of the receiver of said deposit, and each succeeding coupon having on one face means indicative of a deposit to be made and a space associated with it for identification of the receiver of said deposit and also having on the same face means indicative of the preceding coupon and a space for identification of the receiver of the preceding deposit.

In testimony whereof, I have signed my name to this specification.

GEORGE H. KENT.